United States Patent

Kinoshita et al.

[11] Patent Number: 5,774,157
[45] Date of Patent: Jun. 30, 1998

[54] METHOD OF DENSITY ADJUSTMENT FOR A MAGNETIC PRINTING APPARATUS

[75] Inventors: Kunio Kinoshita, Hachioji; Takashi Iwata, Yokohama; Keiichi Ono, Hino, all of Japan

[73] Assignee: Iwatsu Electric Co., Ltd., Tokyo, Japan

[21] Appl. No.: 452,014

[22] Filed: May 26, 1995

[30] Foreign Application Priority Data

May 30, 1994 [JP] Japan .................................. 6-116583

[51] Int. Cl.$^6$ ........................... B41J 2/385; G03G 13/04; G11B 9/00
[52] U.S. Cl. ......................................... 347/131; 346/74.3
[58] Field of Search ................................ 346/74.2, 74.3; 347/131; 430/39

[56] References Cited

U.S. PATENT DOCUMENTS

| | | | |
|---|---|---|---|
| 4,161,738 | 7/1979 | Kokaji | 346/74.1 |
| 4,163,979 | 8/1979 | Kokaji | 346/74.1 |
| 4,197,563 | 4/1980 | Michaud | 360/56 |
| 4,543,586 | 9/1985 | Parker | 346/74.4 |
| 4,654,289 | 3/1987 | Kokaji | 430/39 |
| 5,140,370 | 8/1992 | Kasai et al. | 355/210 |
| 5,210,546 | 5/1993 | Kokaji | 346/74.2 |
| 5,270,827 | 12/1993 | Kobayashi et al. | 358/298 |
| 5,289,202 | 2/1994 | Yamane et al. | 346/74.3 |
| 5,420,614 | 5/1995 | Fukui et al. | 346/130 |
| 5,517,231 | 5/1996 | Sarraf | 347/252 |
| 5,602,572 | 2/1997 | Rylander | 347/15 |

FOREIGN PATENT DOCUMENTS

| | | |
|---|---|---|
| 53-15835 | 2/1978 | Japan . |
| 53-112754 | 10/1978 | Japan . |
| 61-186977 | 8/1986 | Japan . |

*Primary Examiner*—Safet Metjahic
*Assistant Examiner*—Christopher E. Mahoney
*Attorney, Agent, or Firm*—Paul & Paul

[57] ABSTRACT

The dimensions of a magnetized pattern formed on a recording medium are varied, thereby causing the amount of toner attracted to the recording medium to vary, and thereby adjusting the printing density. This type of variation of the dimensions of the magnetized pattern is preferably achieved by varying the pulse width, that is, the duty cycle, of the recording clock which is supplied to a latent image recording circuit. This printing density adjustment method enables stable adjustment of the printing density.

2 Claims, 8 Drawing Sheets

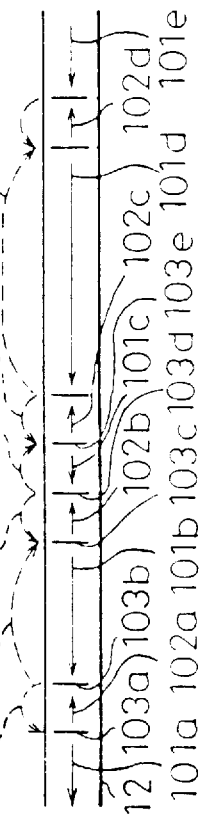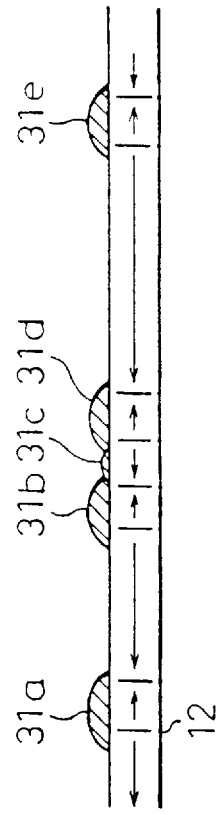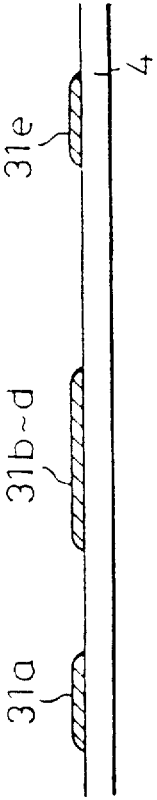
Fig. 3(A) (PRIOR ART) PICTURE SIGNAL
Fig. 3(B) (PRIOR ART) MAGNETIZED PATTERN
Fig. 3(C) (PRIOR ART) DEVELOPING MAGNETIC FIELD
Fig. 3(D) (PRIOR ART) TONER ATTRACTION MODEL
Fig. 3(E) (PRIOR ART) AFTER TRANSFER AND FIXING

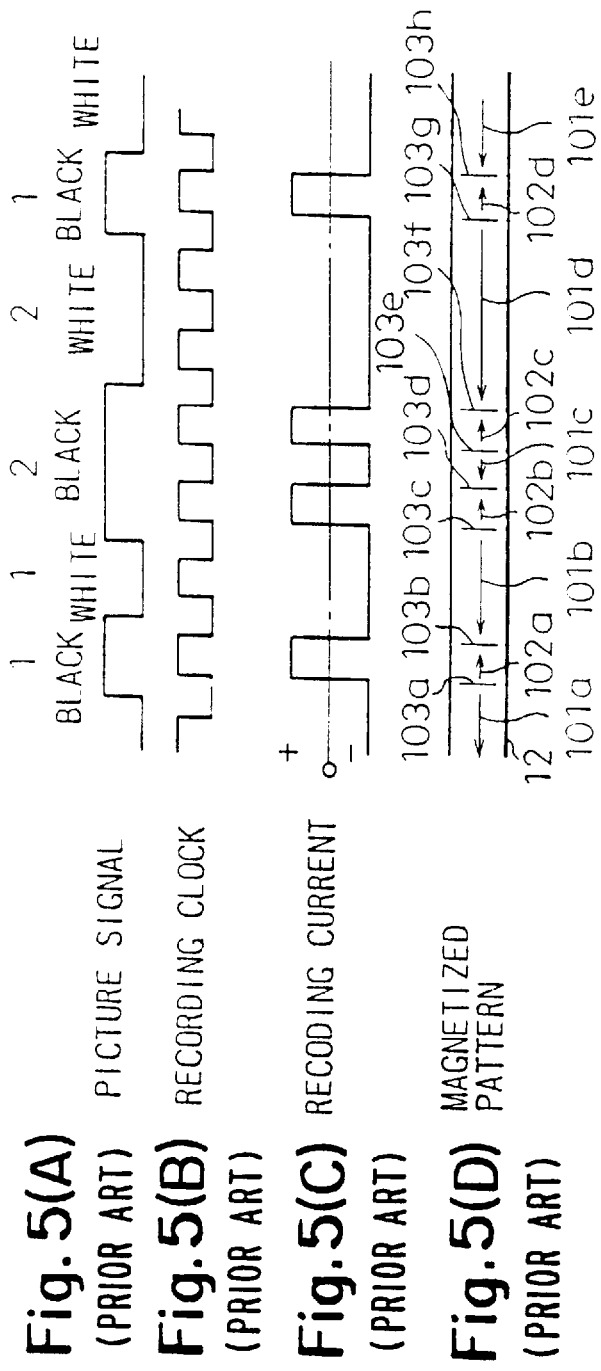

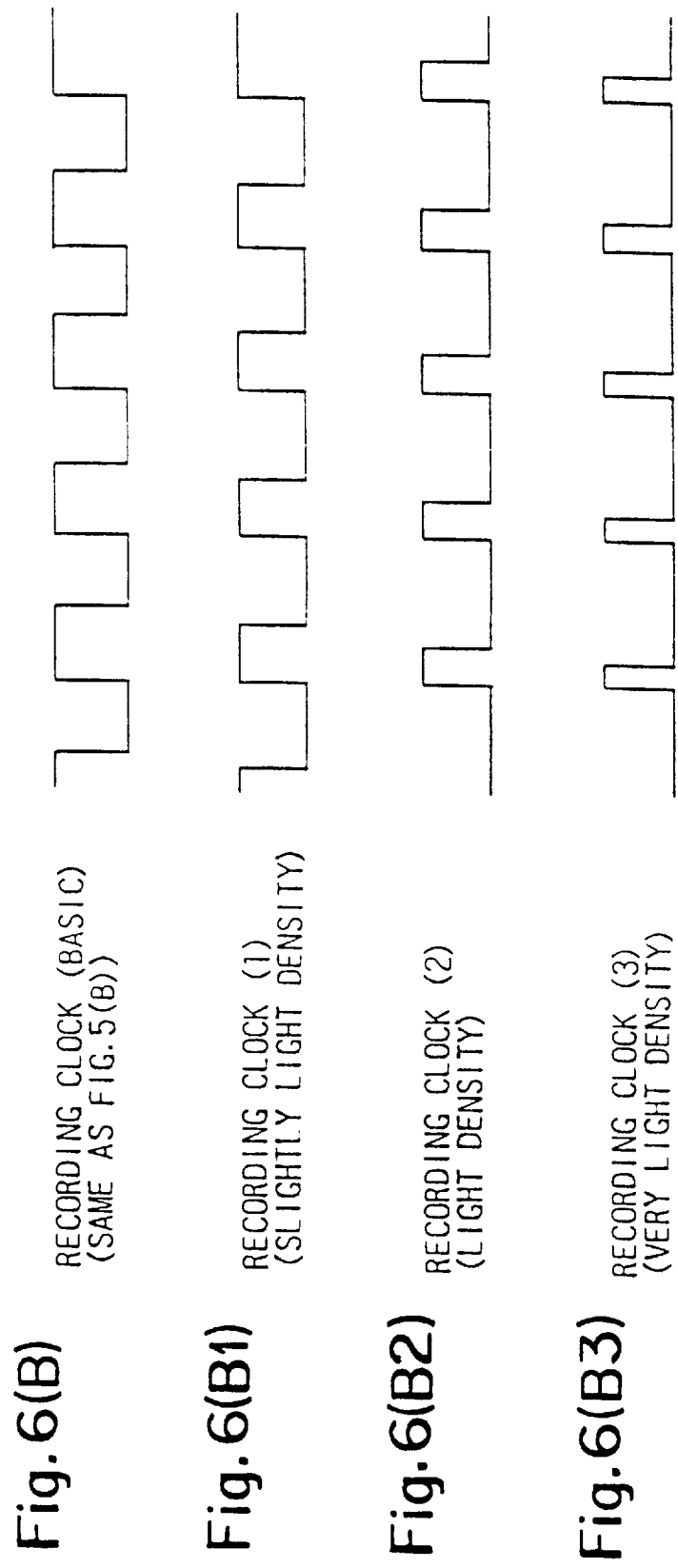

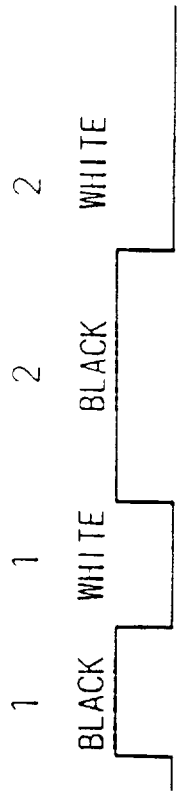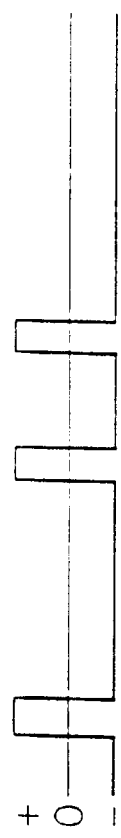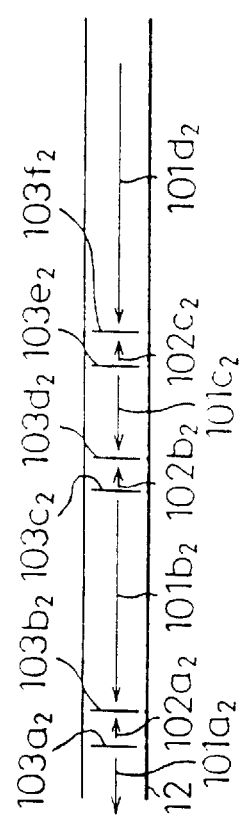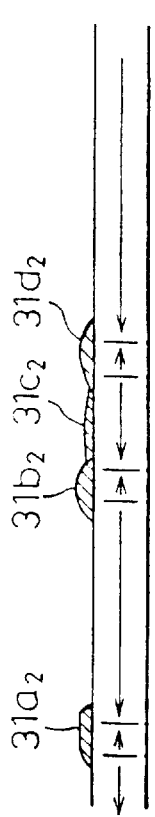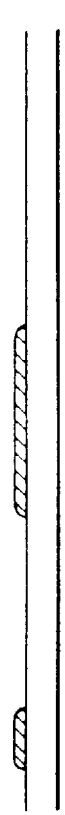
Fig. 7(A) PICTURE SIGNAL
Fig. 7(B2) RECORDING CLOCK
Fig. 7(C2) RECORDING CURRENT
Fig. 7(D2) MAGNETIZED PATTERN
Fig. 7(E2) TONER ATTRACTION MODEL
Fig. 7(F2) AFTER TRANSFER AND FIXING

METHOD OF DENSITY ADJUSTMENT FOR A MAGNETIC PRINTING APPARATUS

BACKGROUND OF THE INVENTION

1. Field of the Invention

The present invention relates to a method of printing density adjustment for a magnetic printing apparatus.

2. Description of the Related Art

In the past, U.S. Pat. No. 4,654,289, granted to Norio Kokaji on 31 Mar. 1987, discloses a useful recording and developing method to achieve high-performance printing. In the method, each dot is formed by at least two magnetic transition regions, and the printing density is governed by the recording clock and the recording medium.

U.S. Pat. No. 4,163,979, granted to Norio Kokaji on 7 Aug. 1977, discloses a useful recording method to change the printing density, wherein the recording density of the latent image is controlled according to the desired printing density.

To adjust the printing density, another possible solution is to change the developing conditions from the ideal condition to a condition in which the supply of toner is slightly insufficient, resulting in reducing the printing density. Further another possible solution is to shift the relative position between the recording head and the recording medium slightly from the ideal position, so that the magnetic field for recording is slightly weakened.

However, neither of the second or third methods offered the ideal conditions and both were forced methods, resulting in unstable operation, thereby preventing stable operation over a long period of time. Specifically, in a magnetic printing apparatus of the prior art, it was very difficult to change the printing density.

SUMMARY OF THE INVENTION

In consideration of the above problems, an object of the present invention is to provide a method of adjusting the printing density in a magnetic printing apparatus, this method being capable of overcoming the shortcomings of the prior art while enabling a stable adjustment of printing density.

To achieve the above-noted object, the present invention provides a method for adjusting the printing density in a magnetic printing apparatus, this method having the steps of forming, in a one-dot black image region on a recording medium, a magnetized pattern in one orientation that has at least two magnetization transfer regions; forming, in a black image region of two or more dots, in addition to said magnetized pattern of one orientation, at least one magnetized pattern in another orientation; forming, in a white image region on the recording medium, a magnetized pattern in the above-noted other orientation, this being longer than the magnetized pattern of the above-noted black image region; developing the image by means of a developing magnetic field having the same orientation as the above-noted other orientation; and changing the length of the magnetized pattern of the above-noted one orientation of the black image region.

It is desirable that the change in the length of the above-noted magnetized pattern is achieved by varying the pulse width, that is, the duty cycle, of the recording clock supplied to a latent image recording circuit.

When the length of the magnetized pattern of one orientation direction in a black image region is varied in this manner, the magnetic field generated in the magnetic transition region corresponds to the magnetized pattern length attracting the magnetic toner. This means that, when the magnetized pattern is long, toner is attracted to a large surface area, and when the magnetization pattern is short, toner is attracted to a small surface area. When the magnetized pattern is short, the strength of the magnetization is weakened, because stronger demagnetization effect in the direction that is the opposite to direction of the internal magnetization occurs, compared with the case of a long magnetized pattern. As a result, the amount of attracted toner is less for a short magnetized pattern than for a long magnetized pattern. Because the amount of toner attracted onto the recording medium changes, this can be used to adjust the density of printing which is transferred and fixed onto paper or the like.

BRIEF DESCRIPTION OF THE DRAWINGS

Further features and advantages of the present invention will be apparent from the following description with reference to the accompanying drawings, in which;

FIGS. 3(A), 3(B), 3(C), 3(D) and 3(E) are drawings which show the mutual relationships between the picture signal, the magnetized pattern, and the developing magnetic field where FIG. 3(A) is a diagram for a picture signal, FIG. 3(B) is a diagram for a magnetized pattern, FIG. 3(C) is a diagram for a developing magnetic field, FIG. 3(D) is a diagram for a toner attraction model, and FIG. 3(E) is a diagram after transfer and fixing;

FIGS. 5(A), 5(B), 5(C), and 5(D) are timing diagrams for explaining the operation of the latent image recording circuit of FIG. 4 where FIG. 5(A) is a diagram of a picture signal, FIG. 5(B) is a diagram of a recording clock, FIG. 5(C) is a diagram of recording current, and FIG. 5(D) is a diagram of a magnetized pattern.

FIGS. 6(B), 6(B1), 6(B2) and 6(B3) are timing diagrams for explaining the varying of the recording clock duty cycle using the method of the present invention where FIG. 6(B) is a diagram of a recording clock (same as FIG. 5(B)), FIG. 6(B1) is a timing diagram of recording clock (1) (slightly light density), FIG. 6(B2) is a timing diagram of recording clock (2) (light density), and FIG. 6(B3) is a timing diagram of recording clock (3) (very light density);

FIGS. 7(A), 7(B2), 7(C2), 7(D2), 7(E2) and 7(F2) are drawings provided to show a comparison of the picture signal, magnetized pattern, and toner attraction model with those shown in FIG. 3 where FIG. 7(A) is a diagram of a picture signal, FIG. 7(B2) is a diagram of a recording clock, FIG. 7(C2) is a diagram of recording current, FIG. 7(D2) is a diagram of magnetized pattern, FIG. 7(E2) is a diagram of toner attraction model, and FIG. 7(F2) is a diagram after transfer and fixing;

DESCRIPTION OF THE PREFERRED EMBODIMENT

An embodiment of the present invention will be described in detail below, with reference to the accompanying drawings.

Figure 1:
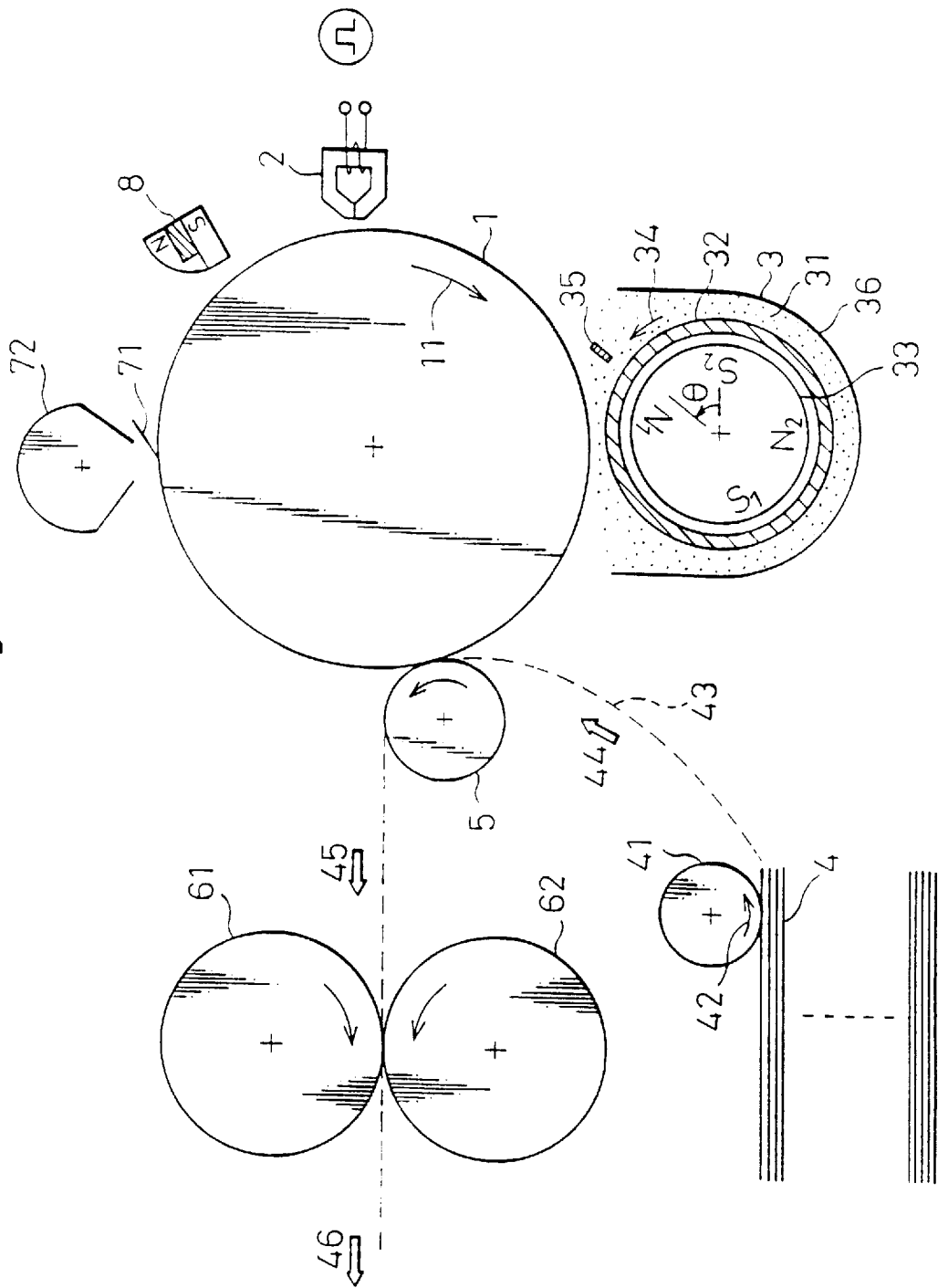
FIG. 1 is a drawing which shows a magnetic printing apparatus related to an embodiment of the present invention.

FIG. 1 shows a magnetic printing apparatus to which the present invention applied. This figure is also shown in the above-noted U.S. Pat. No. 4,654,289. Its operation is as follows. A recording drum 1 moves in the direction of the arrow 1, a latent magnetic image being recorded onto the recording drum 1 by the recording head 2. This latent magnetic image is developed by a developer 3, and a magnetic toner 31 is attracted to the recording drum. Recording paper 4 is fed out by means of the feed roller 41 and passes along the path indicated by the broken line 43 in the direction of the arrow 44. The transfer roller 5 transfers toner from the drum 1 to the recording paper 4. Next, the recording paper 4 is fed in the direction of the arrow 45, passing through the fixing rollers 61 and 62, at which the toner is fixed, and is ejected in the direction of the arrow 46. The remaining untransferred toner is removed from the recording drum 1 by means of the cleaner blade 71 and the suction cleaner 72. Then, before the next latent magnetic image is formed, an erase head 8 operates to erase the previous latent image.

The developer 3, as shown in FIG. 1, is formed by the toner 31, a sleeve 32 which rotates in the direction of the arrow 34, a developing magnet 33 inside of that sleeve, a toner height plate 35, and a housing 36. The reference symbols $N_1$, $S_1$, $N_2$, and $S_2$ inside the developing magnet 33 indicate under dual magnets.

Figure 2:
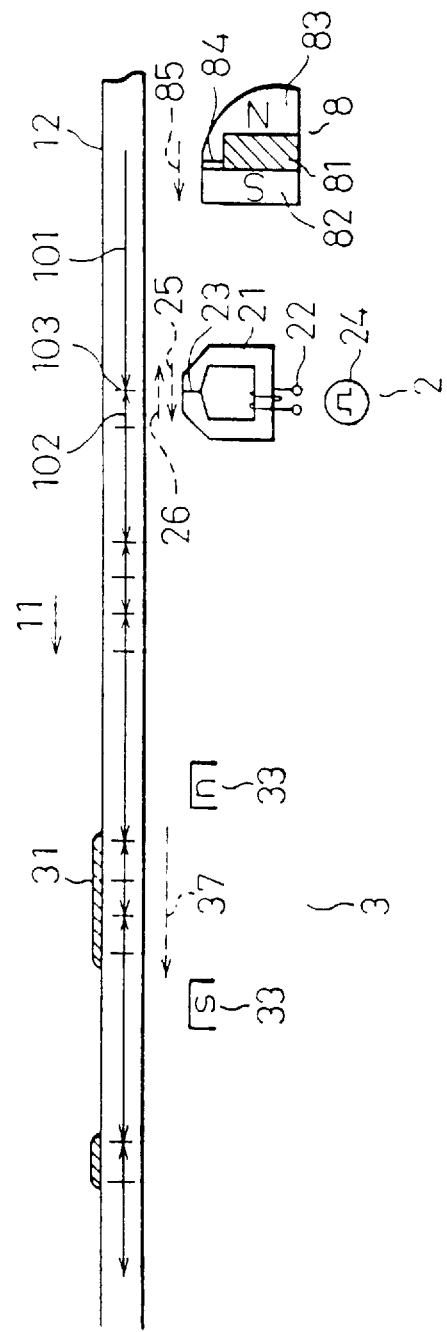
FIG. 2 is a drawing which shows the mutual relationships between the recording drum and the surrounding area in the magnetic printing apparatus shown in FIG. 1, using a linear model.

FIG. 2 shows model representation of the relationship between the recording medium 12 of the drum, the erase head 8, the recording head 2, and the developer 3. This figure is also shown in the above-noted U.S. Pat. No. 4,654,289. The recording drum moves in the direction of the arrow 11. The recording medium 12 of the recording drum is first magnetized in one direction by means of the erase head 8. The erase head 8 is, for example, a permanent magnet 81 sandwiched between the magnetically soft magnetic holders 82 and 83, and having a opposing-face gap 84 at the part which comes into proximity with the recording medium 82. In the condition shown in FIG. 2, a left-pointing magnetic field in the direction indicated by the arrow 85 is generated from the N pole to the S pole of the permanent magnet 81, and when the recording medium 12 passes nearby, it is magnetized in the left-pointing direction 101. When the action of the erase head 8 is stopped, the opposing-face gap 84 moves away from the recording medium 12. Of course it is possible to use a current driven electromagnetic erase head in place of the permanent magnet.

Next, a latent magnetic image in response to an picture signal is recorded onto the recording medium 12 by the recording head 2. Head 2 is formed by a core 21, a coil 22, and an opposing-face gap 23, the orientation of the recording magnetic field generated externally at the opposing-face gap 23 is established by the polarity of the current 24 flowing in the coil 22 as either the same direction 25 as the magnetic field generated by the erase head 8 or as the opposite direction 26. If the recording magnetic field 26 which is in the opposite direction is generated, the recording medium 12 is magnetized in the right-pointing direction 102. A magnetization transfer region is formed at the border between a left-pointing magnetized pattern 101 and a right-pointing magnetized pattern 102.

High-performance printing is achieved by making the developing magnetic field 37 from the developer 3 be in the same direction as the magnetized pattern 101 in accordance with the erase magnetic field 85, as is shown in the above-noted U.S. Pat. No. 4,654,289.

When printing, the printing density is determined depending on whether a lot or a small amount of toner 31 is attracted to the recording medium 12.

FIG. 3 is a drawing which shows the mutual relationship between the picture signal, the magnetized pattern, and the developing magnetic field. This figure is also shown in the above-noted U.S. Pat. No. 4,654,289. The magnetized pattern recorded in response to the picture signal shown in FIG. 3(A) is as shown in FIG. 3(B). A magnetic field is generated at magnetization transfer region so that the toner 31 is attracted. For example, as shown in FIG. 3(B), a magnetic field having an orientation as shown by 110a is generated from the magnetization transfer regions 103a and 103b. When developing is done with a developing magnetic field 37 such as shown in FIG. 3(C), toner 31a is attracted, this extends beyond 103a and 103b, as shown in FIG. 3(D). In contrast to this, a magnetic field having an orientation as shown by 110d is generated from 103d and 103e, this being in the opposite direction to the developing magnetic field 37. For that reason, when vector addition is performed, the toner 31c which is attracted at the location of magnetic transfer regions 103d and 103e is considerably smaller than the toner 31a.

Figure 4:
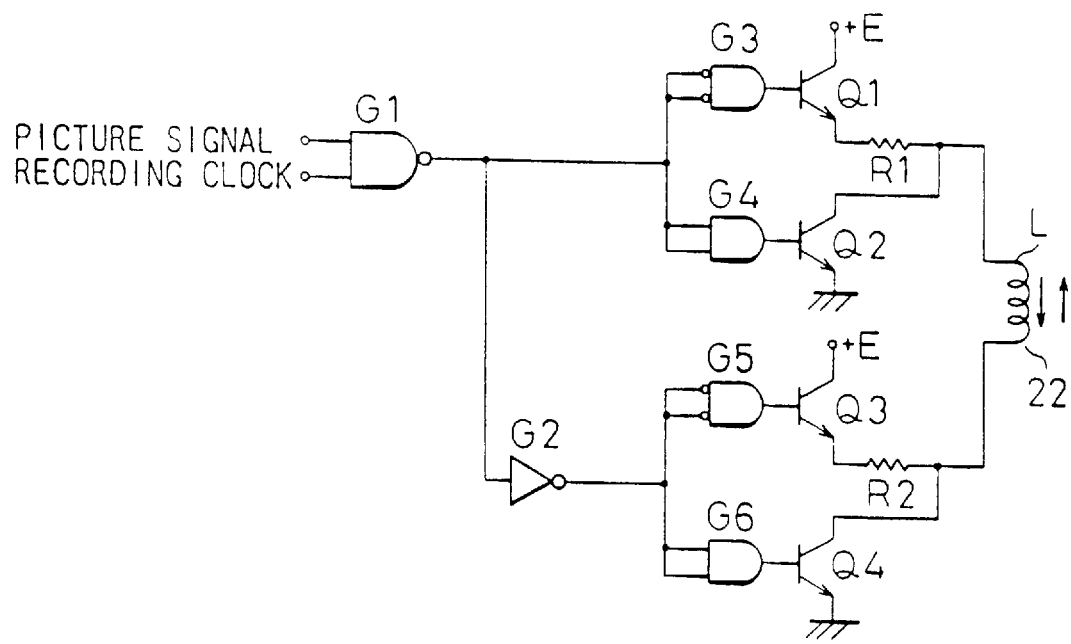
FIG. 4 is a circuit diagram of the latent image recording circuit.

FIG. 4 shows latent image recording circuit which records the magnetized pattern such as shown in FIG. 3(B) in response to an picture signal as shown in FIG. 3(A), and FIG. 5 shows the associated timing relationships. Details of operation are as indicated in the above-noted U.S. Pat. No. 4,654,289. Stated simply, when the AND condition between the picture signal and the recording clock is satisfied, transistors Q1 and Q4 are on, and transistors Q2 and Q3 are off, so that a recording current is generated which flows from the power supply +E through Q1, and then successively through resistor R1, coil L, Q4, and finally ground. This results in the recording of a right-pointing magnetized pattern (for example 102a). In contrast to this, when the AND condition between the picture signal and the recording clock is not satisfied, transistors Q2 and Q3 are on, and transistors Q1 and Q4 are off, so that a recording current is generated which flows from the power supply +E through Q3, and then successively through resistor R2, coil L, Q2, and finally ground. This results in the recording of a left-pointing magnetized pattern (for example 101a).

In this condition, consider the substitution of the recording clock of FIG. 5(B), that is, as shown in FIG. 6(B), with one that has a narrower pulse width, as shown in FIG. 6(B2). If this is done, as shown in FIG. 7, with respect to the (B2) recording clock, the recording current is as shown at (C2), the magnetized pattern on the recording medium 12 being as shown at (D2). As a result, for example, the distance between magnetic transfer regions $103a_2$ and $103b_2$ is shorter than the distance between magnetic transition regions 103a and 103b to the degree that the pulse width is shortened. When the distance between magnetic transition regions $103a_2$ and $103b_2$ is made shorter, the influence of the demagnetization field that is generated in a direction opposite to the direction of the internal magnetization is strong, resulting in a reduction in the magnetization. As a result, the amount of attracted toner $31a_2$ is reduced from the amount of toner 31a shown in FIG. 3, by the amount of the reduction of the magnetization of magnetized pattern $102a_2$ with respect to 102a of FIG. 3. Therefore, the printing density when toner $31a_2$ is transferred to paper or the like and fixed using the recording clock (B2) is lighter than the case in which the recording clock (B) is used. That is, the recording is lower in density when a recording clock with a shorter pulse width is used.

Figure 8:
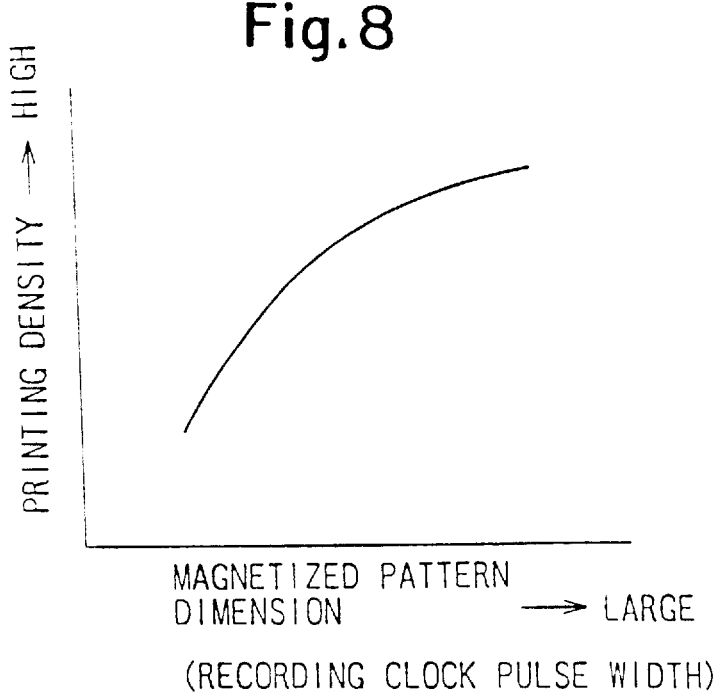
FIG. 8 is a graph which shows the relationship between the magnetized pattern dimensions and the printing density in the present invention.

According to this method, in the case of black mark of more than 2 dots, for example the magnetized pattern $101c_2$ in FIG. 7, the mark lengthened with respect to $101c$ (FIG. 3) to the extent that $102b_2$ is shorter than $102b$. However, as shown in the above-noted U.S. Pat. No. 4,654,289, because the magnetic field generated from this part has a direction which is opposite to the developing magnetic field, the results of a vector addition are that the amount of attracted toner $31c_2$ is very small, so that this does not influence the overall density. Thus, the relationship between the recording clock pulse width and the printing density is as shown in FIG. 8.

Figure 9A:
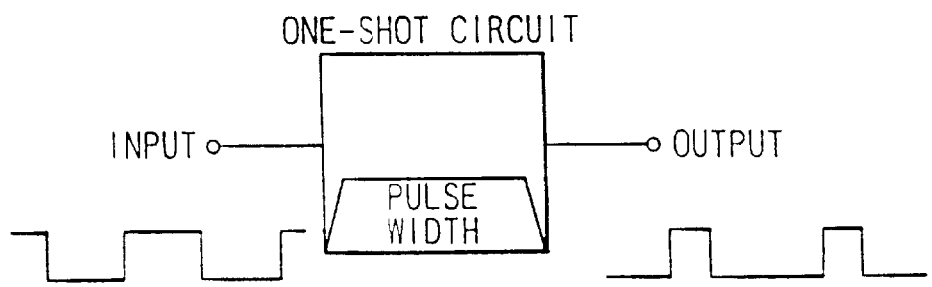
FIG. 9A and FIG. 9B are circuit diagrams which show examples of the configuration of the recording clock generating circuit used to implement the present invention.
Figure 9B:
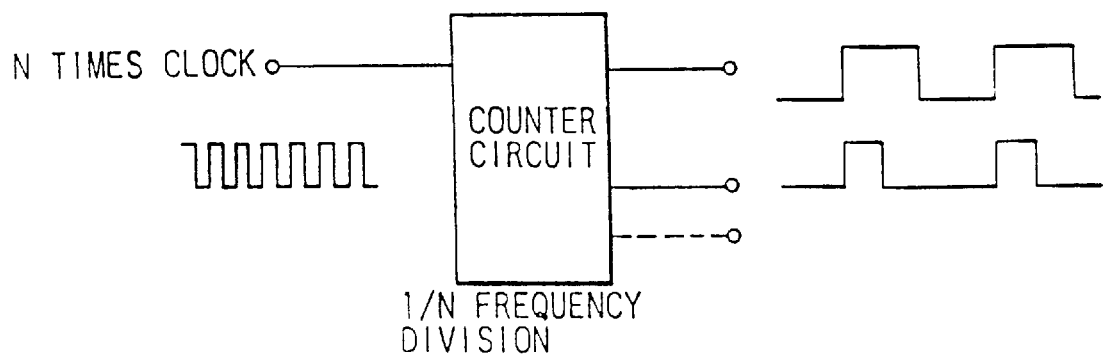

By using a one-shot circuit, such as shown in FIG. 9A, for the purpose of varying the recording clock pulse, that is, for the purpose of varying the duty cycle, and inputting the basic recording clock into this one-shot circuit and appropriately setting the time constant of the one-shot circuit, it is possible to generate a recording clock with an arbitrary pulse width. Another method, shown in FIG. 9B, is one in which a clock at N times the basic clock is frequency divided by a 1/N counter, the pulse width (duty cycle) of after this frequency division being arbitrarily selected to generate a recording clock with an arbitrary pulse width. A variety of other methods can also be used.

An embodiment of the present invention has been described above. It will be apparent, however, that the present invention is not limited to the described embodiment, it being easy for a person skilled in the art to devise a variety of other embodiments.

As described above, according to the present invention, it is possible, by varying the duty cycle of the recording clock used to form the magnetizing pattern for recording on the recording medium, to achieve stable adjustment of printing density.

What is claimed is:

1. A method for adjusting the printing density in a magnetic printing apparatus, comprising the steps of:

forming, in a one-dot black image region on a recording medium, a magnetized pattern in one orientation that has at least two magnetization transfer regions;

forming, in a black image region of two or more dots, in addition to said magnetized pattern of one orientation, at least one magnetized pattern in another orientation;

forming, in a white image region on said recording medium, a magnetized pattern in said other orientation, this being longer than the magnetized pattern of said black image region;

developing the image by means of a developing magnetic field having the same orientation as said other orientation; and changing the ratio of the length of a magnetized pattern of said one orientation to the length of a magnetized pattern of said other orientation, with the sum of both lengths kept constant, in a black image region of two or more dots.

2. The method according to claim 1, wherein the change of the length of said magnetized pattern is achieved by varying the pulse width, that is, the duty cycle of the recording clock which is supplied to a latent image recording circuit.

\* \* \* \* \*